(12) United States Patent
Samaroo et al.

(10) Patent No.: US 8,061,421 B2
(45) Date of Patent: Nov. 22, 2011

(54) BOREHOLE SEISMIC PULSE GENERATION USING RAPID-OPENING VALVE

(75) Inventors: Mahendra Samaroo, Edmonton (CA); Ronald E. Pringle, Houston, TX (US); Thomas James Timothy Spanos, Edmonton (CA); Brett Charles Davidson, Cambridge (CA)

(73) Assignee: Wavefront Energy & Environmental Services Inc., Cambridge, Ontario (CA)

( * ) Notice: Subject to any disclaimer, the term of this patent is extended or adjusted under 35 U.S.C. 154(b) by 591 days.

(21) Appl. No.: 12/066,516

(22) PCT Filed: Sep. 18, 2006

(86) PCT No.: PCT/US2006/036170
§ 371 (c)(1),
(2), (4) Date: Mar. 12, 2008

(87) PCT Pub. No.: WO2007/100352
PCT Pub. Date: Sep. 7, 2007

(65) Prior Publication Data
US 2008/0302528 A1 Dec. 11, 2008

(30) Foreign Application Priority Data

Sep. 16, 2005 (GB) .................................. 0518945.1
Mar. 3, 2006 (GB) .................................. 0604295.6

(51) Int. Cl.
*E21B 28/00* (2006.01)
(52) U.S. Cl. .................................................. 166/177.5
(58) Field of Classification Search ............... 166/308.1, 166/373, 177.1, 177.2, 177.5; 181/106, 113, 181/119
See application file for complete search history.

(56) References Cited

U.S. PATENT DOCUMENTS 5,297,631 A * 3/1994 Gipson .......................... 166/299
5,836,393 A * 11/1998 Johnson ...................... 166/308.1

* cited by examiner

*Primary Examiner* — David Bagnell
*Assistant Examiner* — David Andrews
(74) *Attorney, Agent, or Firm* — Anthony Asquith Corp

(57) ABSTRACT

During a surge-pulsing operation in a borehole (e.g an oil-well undergoing remediation) liquid is stored under pressure upstream of a valve, and then released through the valve suddenly enough to create a seismic wave, which propagates into the formation around the borehole, and assists the surge-pulsing to improve the conductivity and liquid-injectability of the formation. The downhole valve achieves the rapid-opening requirement by virtue of its geometrical layout, as dictated by the strictures of the downhole environment.

18 Claims, 7 Drawing Sheets

(B-B)

(A-A)

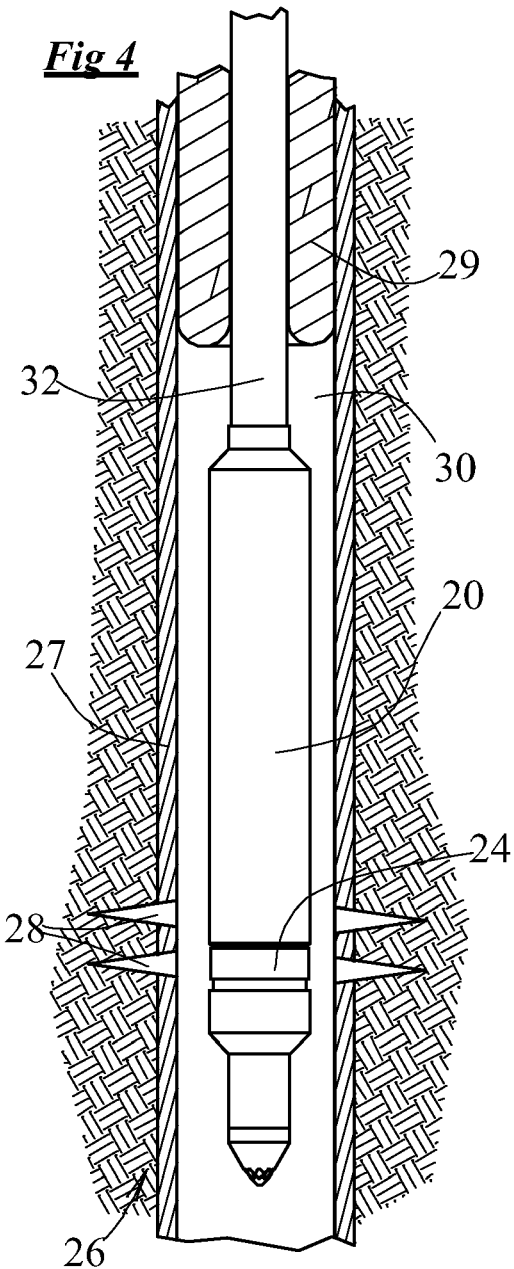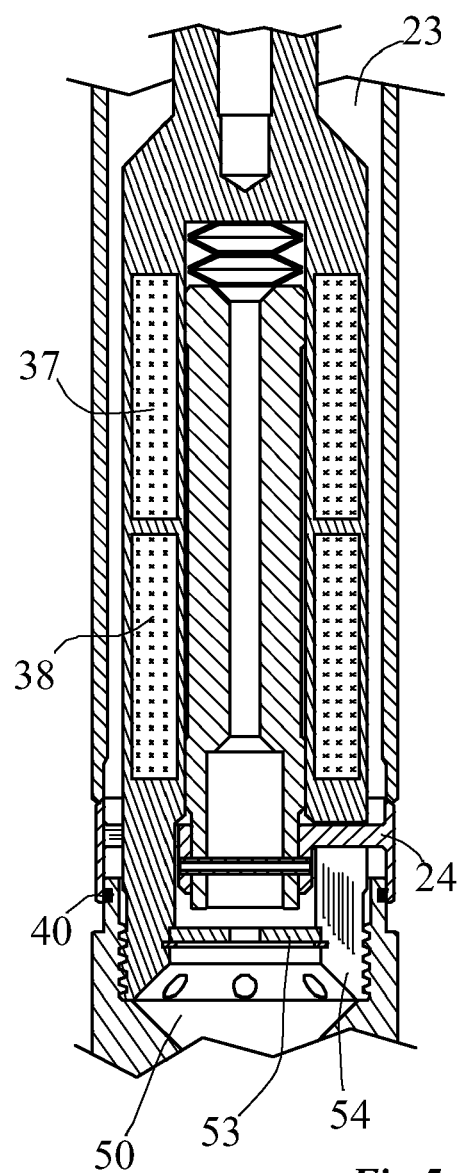

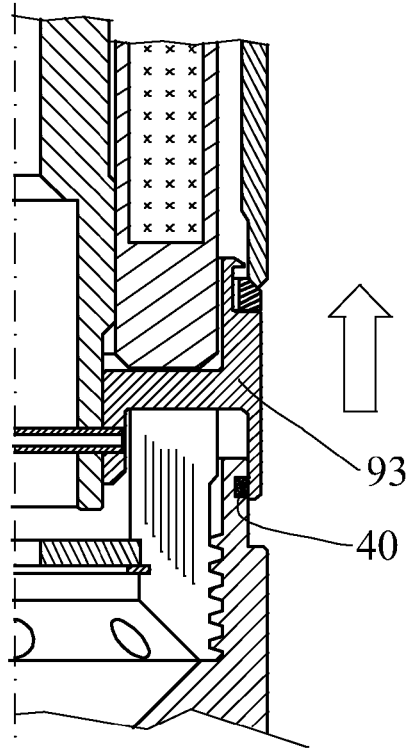
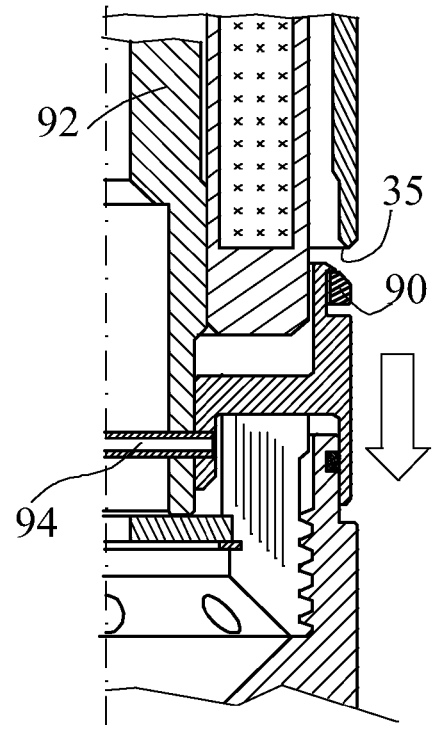
*Fig 14a*  *Fig 14b*
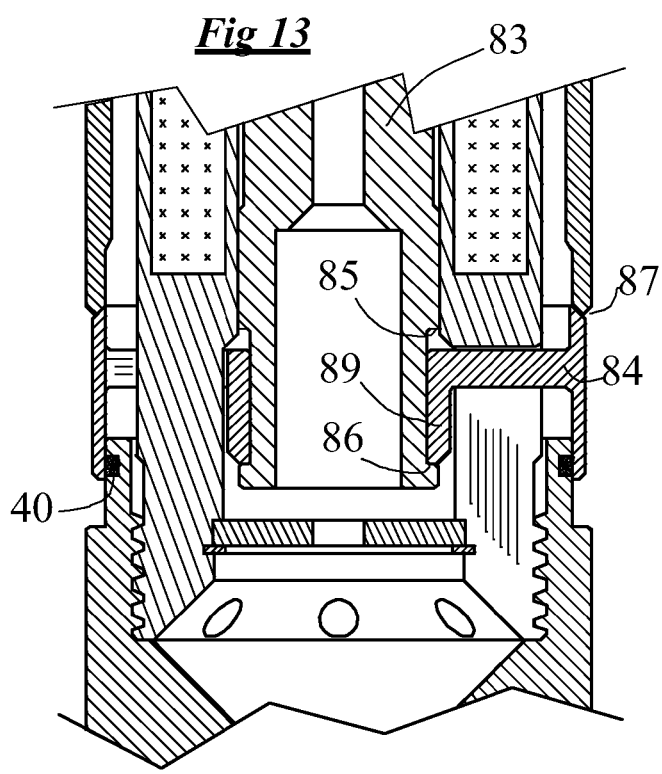
*Fig 13*
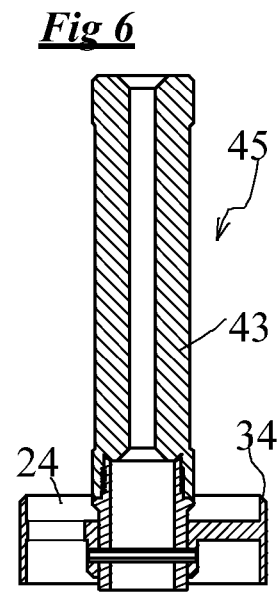
*Fig 6*

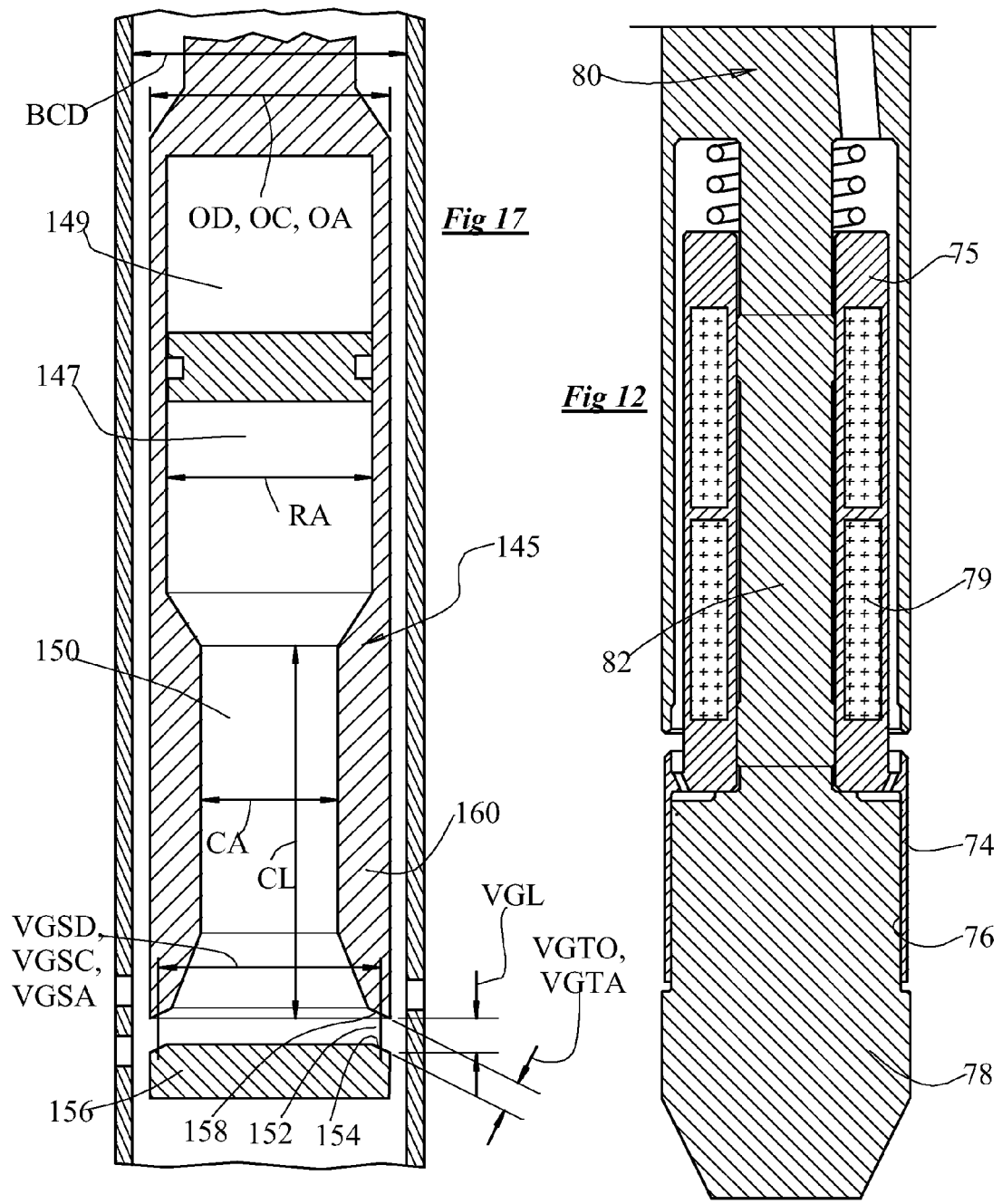

BOREHOLE SEISMIC PULSE GENERATION USING RAPID-OPENING VALVE

The technology described herein relates to boreholes in the ground, and to injecting pressurised liquid very rapidly out from the borehole into the surrounding ground formation.

In utilising such technologies as are described in patent publication U.S. Pat. No. 6,241,019, it is apparent that different types of waves or pulses are sometimes needed in the ground. For example, surge-pulsing (as described in that publication) can be very effective in homogenising the ground around a borehole, and thus maximising the ground's conductivity. In surge-pulsing, a large charge-volume (e.g several liters) of liquid is injected into the ground, per stroke, and the liquid surges or sloshes out and back with respect to the borehole, each pulse. The liquid/ground homogenising effect can be radiated large distances (e.g scores of meters) away from the borehole during a surge-pulsing operation.

Effective though surge-pulsing is. It has been recognised that the procedure can be enhanced (i.e the liquid/ground homogenising effect can be made to extend even further, radially, from the borehole) by adding a seismic component to the surges. This can be done conveniently at the very start of the pulse, by storing up a large hydraulic pressure head in the borehole, and then opening a valve to release the charge-volume into the ground very suddenly and rapidly. The resulting pressure pulse or seismic wave radiates through the ground carrying the injected charge-volume, and it may be regarded that the seismic pulse "prepares the way" for the successive seismic pulses.

A high-energy seismic-pressure pulse can cause the porosity of the ground to increase momentarily. That is to say, at a particular point in the ground formation, as the seismic waves approach and pass, the sudden increase in pressure lifts the ground slightly, at that point. If the ground has a porosity of, say, thirty percent, the passing wave can increase the porosity of the ground in the order of as much as a tenth of a percent. The seismic (pressure) wave can thus also be regarded as a porosity wave. As pressure increases, so conductivity increases, with the result that a larger charge-volume of liquid can be injected greater distances into the ground, per pulse. The above is not intended as a complete and accurate account of how/why adding a seismic component can enhance bulk-volumetric pulses: suffice it to say that in many instances that is what happens.

It is a design aim to provide an apparatus that is capable of injecting a charge-volume of pressurised liquid out through the perforations in the well-casing, and into the surrounding ground formation, and is capable of injecting at (east a portion of the charge-volume at a flowrate that changes quickly enough to induce a significant seismic (porosity) wave to propagate through the ground formation around the borehole. Another aim is to provide an apparatus that can provide such injection of liquid on a continuous cycling basis. Cycle rates will vary within the range, typically, from three cycles per second to two cycles per minute. Typically, the kind of cycling which benefits from introducing a seismic component to the cycle is continued for a few hours or a few days (and for much longer in some cases).

It may be noted that cycling having a seismic component is usually only carried out when the ground is already fully saturated with liquid, and indeed over-saturated, and the in-ground liquid is at a substantial pressure. Furthermore, the in-ground liquid around the borehole should have been transformed (e.g by a period of surge-pulsing) into a coherent body.

The benefit of introducing the seismic component into the surge-pulses, at such time, is that the extent of the coherent body can be engineered to extend a few (or several) more meters radius away from the borehole. Furthermore, it may be expected that as the body becomes more coherent, so "fingering" of the injected liquid tends to be reduced, in that the ground between the fingers gradually, in turn, becomes saturated with liquid.

Thus, in a typical liquid injection operation, at first liquid is simply injected into the ground under a static pressure. Then, once the ground has become saturated, the technicians commence surge-pulsing, the effect of which is that, even though the ground is already saturated, large extra volumes of liquid can be injected into the ground. Gradually, the coherent body of liquid is created, around the borehole, which surges out and back, as a body, every cycle.

After a period of surge-pulsing, the technicians determine that the ground has now become saturated (i.e now over-saturated) once again (that is to say; no more (or almost no more) liquid can be injected into the ground per cycle). Now, this is the time when introducing a seismic component to the surge-pulsing cycle can be effective to extend the coherent body still further away horizontally radially (and vertically) from the borehole.

The seismic surge-pulsing might comprise, say, 100,000 cycles in a typical application. The number of cycles of course varies a great deal from site to site, but it will be understood that there is a heavy requirement for the apparatus to be engineered for a prolonged service life.

DETAILED DESCRIPTION OF PREFERRED EMBODIMENTS

By way of further explanation, exemplary apparatuses will now be described with reference to the accompanying drawings, in which:

FIG. 4 is a view of an injector apparatus installed in a borehole in the ground.

FIG. 5 is a cross-section of a portion of an injector apparatus, shown in a closed condition.

FIG. 6 is a cross-section showing some of the movable components of the apparatus of FIG. 1.

FIG. 12 is a cross-section of another downhole injector apparatus.

FIG. 13 is a cross-section of a portion of a further injector apparatus, shown in a closed condition.

FIG. 14a is a cross-section of a portion of another injector apparatus, shown in a closed condition.

FIG. 14b is the same section as FIG. 14a, but shows the apparatus in an open condition.

FIG. 17 is a diagrammatic cross-section of a further downhole injector apparatus.

The apparatuses shown in the accompanying drawings and described below are examples. It should be noted that the scope of the patent protection sought is defined by the accompanying claims, and not necessarily by specific features of exemplary apparatuses.

Figure 2:
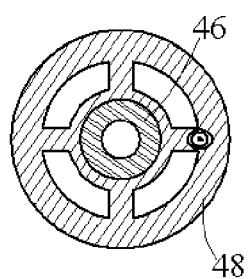
FIG. 2 is a section on line 2-2 of FIG. 1.
Figure 3:
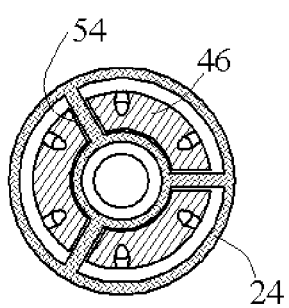
FIG. 3 is a section on line 3-3 of FIG. 1.
Figure 1:
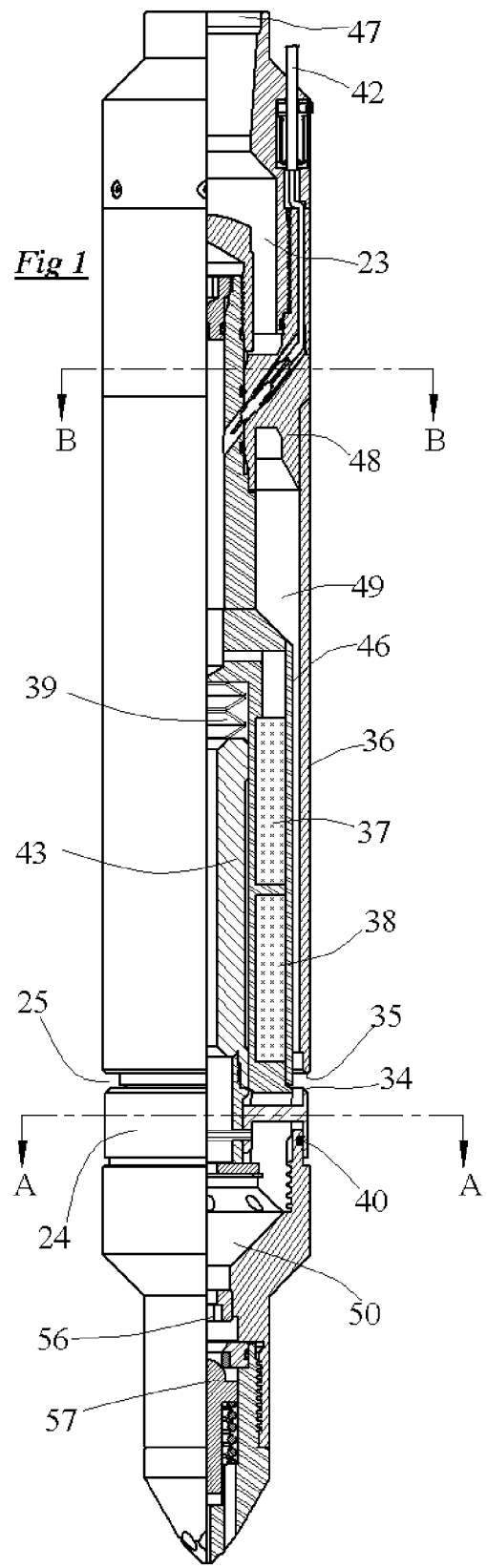
FIG. 1 is a partial cross-section of an injector apparatus, shown in an open condition.

In the injector apparatus 20 of FIGS. 1-3, pressurised liquid is fed into the apparatus from above, and occupies the chamber 23. When the slider 24 is DOWN, as shown in FIG. 1, the liquid passes out from the interior chamber 23, through the gap 25.

The injector apparatus of FIGS. 1-3 is used in the manner indicated in FIG. 4. Here, a borehole 26 has been made in the ground, and the borehole is lined with a well-casing 27. Perforations 28 have been made in the well-casing 27 at a pre-determined depth. The intent is to inject water or other liquid into the surrounding ground formation, at the desired depth, out through the perforations 28.

Once the injector apparatus 20 is at the correct depth, an inflatable packer 29 is positioned above the injector apparatus, which seals off the annular space 30 between the well-casing 27 and the rod 32 upon which the injector 20 is supported.

The rod 32 is hollow, and serves to convey liquid down from a reservoir at the surface to the injector assembly. A pump and other facilities are provided at the surface.

The injector apparatus includes the valve member or slider 24. When the slider is in the UP position (as in FIG. 4), the (male) conical sealing face 34 of the slider 24 engages the (female) conical seat face 35 of the body 36. When the slider 24 is in the DOWN position (FIG. 1), liquid can flow out through the open gap 25, into the annular space 30, and thence out through the perforations 28 into the ground formation around the borehole.

When getting ready to operate the injector apparatus, the gap 25 is full-open, i.e the slider 24 is DOWN, while liquid is pumped from the surface down into the borehole, and out into the formation. This continues until the ground around the borehole is saturated. The solenoids 37,38 would not normally be operated during this preliminary phase. The slider 24 adopts the DOWN position when neither solenoid is energised.

Once the ground is saturated, now the pulsing phase commences. Operating the solenoids 37,38 in sequence first raises the slider 24, thereby closing off the gap 25, and then drives the slider forcefully downwards, thereby opening the gap 25. The solenoids are triggered from the surface, either by the engineer manually or in accordance with a cycling program.

As mentioned, one of the desired effects of surge-pulsing is to make the ground more saturated. This may be explained as follows. When the ground is simply pressurised, a point is reached at which no further liquid can be forced into the ground at a given applied pressure (more liquid can be forced into the ground if the steady pressure is increased, of course). After surge-pulsing has been carded out, now more (often, a lot more) liquid can be forced into the ground at the applied pressure. Surge-pulsing effectively increases the sizes of the pore spaces. The saturation that arises from a steady applied pressure may be termed static-saturation, and the greater saturation that arises from pulsed applied pressure may be termed dynamic-saturation.

If neither solenoid is energised, the biassing springs 39 urge the slider 24 to the full-open or DOWN position. Prior to pulsing, when the slider is DOWN, the (upper) closing-solenoid 37 has to exert enough force to overcome the springs 39, and to overcome seal-friction in the dynamic balance-seal 40.

As there is no pressure differential across the balance-seal 40 when the gap 25 is open, seal-friction at this time is minimal.

After the valve has closed, and the pressure inside the chamber 23 has been charged up to e.g 5 MPa, now there is a pressure differential across the balance-seal 40, and it can be expected that the seal-friction, which now opposes the downwards (opening) motion of the slider 24, at this time will be high. The (lower) opening-solenoid 38, assisted by the springs 39, must overcome this friction, and must do so with an over-excess of force, such that the slider is driven downwards forcefully and very rapidly. Preferably, the slider should move from closed to full-open in a time period, typically, of less than fifty milliseconds, and preferably about fifteen milliseconds, and the (lower) opening-solenoid 38 should be designed to supply enough force to accomplish this.

The operating diameter of the balance-seal 40 preferably should be made slightly less than the operating diameter at which the seal-face 34 engages with the seat-face 35. If the two operating diameters were equal, any hydraulic pressure differential across the seal would exert no net biassing force on the slider. When the balance-seal 40 diameter is made a little smaller than the seat 35 diameter, a hydraulic pressure differential now exerts a net force tending to urge the slider towards the open condition, and that is preferred. (That is to say, the pressure differential assists the springs 39 in biassing the slider towards the open condition.) On the other hand, the difference between the seal diameters should not be large, in that the force resulting therefrom has to be resisted by the closing-solenoid 37. A difference in diameter of about half a millimetre is typical, in a case where the overall diameter of the injector apparatus 20 is thirteen centimeters, and the hydraulic pressure differentials are 5 MPa or more.

Liquid from the surface enters the chamber 23 via the port 47. The housing component 48 is open-spoked (see FIG. 2), whereby the space 49 is included in chamber 23. The slider 24 is also open-spoked (see FIG. 3), whereby the space 50 is also included (hydraulically) in the chamber 23. The coil housing 46 has slots 54 to accommodate the spokes of the slider 24.

An electric cable 42 leads down from the surface. Leads (not shown) convey power to the opening-solenoid 36 and the closing-solenoid 37. Other items electrically connected to the surface include instruments (not shown), such as pressure transducer, etc.

When the upper closing-solenoid 37 is energised, the core 43 is urged upwards. The slider 24 is operationally unitary with the core 43 to form a core/slider 45 (FIG. 6). Most of the components of the apparatus are of stainless steel; however, the core 43 itself is of a magnetic material. The core is free-sliding inside the coil housing 46. Solenoids work by creating a force urging the core to move, axially, to a position where the magnetic material is evenly disposed between the two ends of the solenoid; thus, the core—that is to say, the magnetisable portion of the core—should be disposed well off to one side, axially, of the coil. This is simple to provide, in respect of both solenoid coils, when the coils are disposed end to end, as seen in FIG. 1. That is to say, a core passing through both solenoids is well off-centre with respect to either coil individually.

In operation, the solenoids 37,38 are so operated as to reciprocate the core/slider unit 45. A typical reciprocating cycle is in the region of one to three Hertz. For the apparatuses as depicted herein, cycling at speeds faster than about 0.5 Hz would not be advisable. The slowest rate, beyond which the apparatuses as depicted herein would hardly offer any advantage, would be, say, once every thirty seconds. Reciprocation continues for periods that are measured in hours or days.

As mentioned, in order for the reciprocations to produce seismic pulses, in addition to the out-and-back bulk-volumetric surge-pulses, the gap 25 should move from closed to full-open violently, i.e in the shortest possible time. It is recognised that this time can be as small as the desired fifteen milliseconds, in an injector that functions reliably over a long service life, if the apparatus is designed as described herein.

To this end, the gap 25 preferably is structured as axially-short/diametrally-large. The alternative, i.e axially-long/diametrally-small, is much less preferred, from the standpoint of rapidly creating a very large opening. One reason for preferring a gap that is axially-short/diametrally-large, is that only a small magnitude of movement of an axially-moving component is needed to rapidly create a very large opening. Maximising the diameter of the gap 25 minimises the axial movement of the slider 24 that is needed in order to achieve the desired flowrate. Another reason is that solenoids are more efficient when exerting their forces over a small working travel. The valve should be designed such that the gap 25 is of the maximum diameter that can reasonably be accommodated within the casing of the wellbore.

In the illustrated apparatus, the outside diameter of the slider 24 is slightly less than the outside diameter of the outer body 36, in order that the (movable) slider 24 may be protected from being banged against the casing 27 walls as it goes down the borehole. But apart from that, the slider 24 and the gap 25 are as diametrally close to the overall diameter as possible.

The slider 24 is driven downwards quite forcefully when the valve is opened, and the core/slider 45 thus strikes herd against a stop plate 53. Hydraulic or mechanical cushions (not shown) can be arranged to soften that impact, if that is a problem.

It is intended that a plurality of injector apparatuses may be mounted one above the other in the wellbore 26. The several injectors are positioned at appropriate depths relative to respective perforated zones of the casing 27. The injectors are fed with pressurised liquid, all from the same source at the surface, the liquid being transferred through the respective hollow chambers 23 from injector to injector. To prevent the pressure surges in one injector from interfering with another injector, a choke in the form of a small orifice 56 is provided. Liquid can pass through the choke, and slow changes in pressure can therefore gradually equalise, but rapid changes in pressure cannot pass through the choke. A check valve 57 enables liquid under pressure to be fed down to the injectors below, but prevents pressure surges from travelling upwards.

As mentioned, a major reason for desiring a rapid opening of the gap 25 is to create a seismic pulse, having enough energy to propagate a pulse of increased porosity a significant distance out into the surrounding formation. It is the rate of increase of flowrate over a (short) period of time that dictates the energy of that seismic or porosity wave. Given that the flowrate is (more or less) directly proportional to the width of the gap (for a constant pressure differential), therefore, the designer's aim should be to move the slider from closed to full-open in as short a time as possible.

Figure 7:
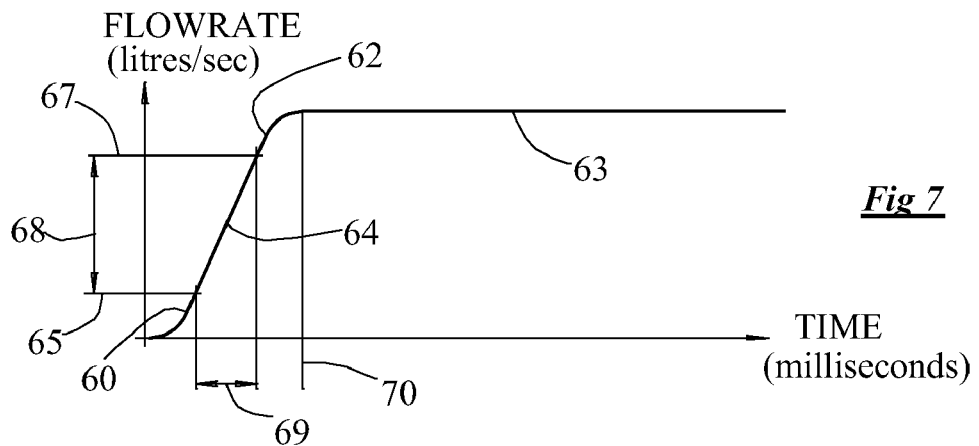
FIG. 7 is a graph showing flowrate of liquid through the apparatus over time.

FIG. 7 is a graph showing the flowrate through the gap 25 over a period of time. At first, the gap is held closed, and the flowrate is zero. The gap starts to open, and the rate at which the gap opens, i.e the speed of the slider in millimeters per second, accelerates from zero. At time 60, the slider has reached its top speed, and now the slider moves at constant (high) speed for the rest of its travel. At time 62, the slider starts to decelerate, as the gap becomes full-open, and then the slider remains stationary in the full-open condition.

The gap 25 is increasing during the period between 60 and 62, and the flowrate is correspondingly increasing. When the gap is full-open, the flowrate remains constant, as at 63. Most of the bulk of the charge-volume is injected or discharged out into the formation after the gap has reached this full-open stage, whereas the seismic wave, i.e the dynamic flow component of the whole wave, is created at the start of the period of opening, between 60 and 62, while the slider is moving. The more rapidly the gap opens, the greater the rate at which the charge-volume is injected into the formation. In other words, the faster the flowrate increases, i.e the steeper the slope of the ramp portion 64 of the graph, the greater the energy of the ensuing porosity wave.

Thus the designer's aim is to create a valve in which the valve goes from full-closed to full-open in the shortest possible time.

The graph embodies the assumption that the flowrate (in liters per second) is a constant multiple of the gap (in millimeters). The linearity is idealised, but it is suggested that the actual graph will be close enough to the true linear for the idealisation not to matter. In a real case, the slider will not accelerate smoothly, as shown, and then maintain a constant speed of opening—but it can be expected to do so approximately. The engineer could take account of the non-linearities, inertia effects, and other departures from the assumed ideal, but it is considered unlikely that doing so would lead to significantly better results than taking the simple idealised case, as shown. Thus, the graph of changing flowrate vs time (in liters per second per second), as shown in FIG. 7, can equally be regarded as a graph of changing gap size vs time (in millimeters per second). (Of course, the flowrate vs gap relationship only remains linear so long as the pressure differential across the gap remains constant, as discussed below.)

For present purposes, the slope of the ramp portion is defined as follows. The full-open gap, termed G-100%, is first ascertained. (In the illustrated apparatus, it was 7.62 mm). The full-closed gap is zero. Now, two more dimensions of the gap are ascertained. The first 65 of these is the one-fifth gap, G-20%, which in the illustrated apparatus would be 1.52 mm. The second 67 is the four-fifths gap, G-80%, which in the illustrated apparatus would be 6.10 mm. Thus, the dimension 68; measured as a change in the gap dimension, is the difference in mm between G-80% and G-20%. The dimension 68 also corresponds to a change in the flowrates; that is to say, the dimension 68 also is the difference between the flowrate (in liters/sec) when the gap was G-80% and the flowrate when the gap was G-20%.

The ramp slope that is of interest in determining the energy of the seismic or porosity wave is defined as the difference 68 between the G-80% flowrate (in liters per second) and the G-20% flowrate, divided by the time 69 taken for the slider to move from the G-20% gap to the G-80% gap. As mentioned, the ramp slope that is actually measured is the difference between the G-80% gap (in millimeters) and the G-20% gap, divided by the time 69.

The steeper the ramp portion 64 of the graph, the more energy is contained in the seismic wave. The portion of the graph between G-20% and G-80% has been selected because it is between those values that the slope of the ramp is at its steepest. If the slope were measured over the whole range, from G-0% to G-100%, the figure for the slope would then be misleadingly smaller. From the standpoint of creating an energetic seismic wave, it is the maximum slope, not the overall slope, that counts, assuming the maximum is sustained over a substantial period of time—such as the period between G-20% and G-80%, for example. In a particular case, if it were known that the maximum slope was already present at a gap of G-10%, for example, that could be used instead, in determining the slope of the ramp.

It is recognised, as a preferred practical feature, that the time 69, being the time period between G-20% and G-80%, should be no more than about fifty milliseconds (and preferably no more than about fifteen milliseconds). It is recognised that if the period 69 is longer than that, the pressure pulse might not have enough energy to create a useful porosity wave in the surrounding formation. There is no preferred lower limit to the period, expect that of the mechanical engineering demands a shorter period would impose on the apparatus.

Figure 8:
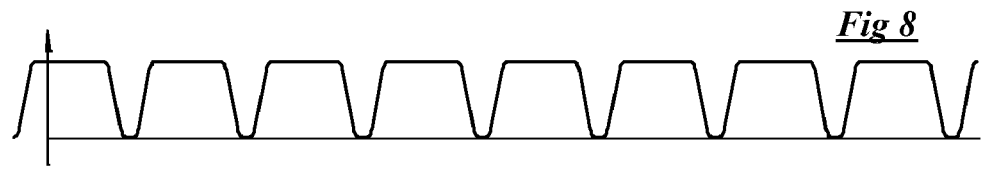
FIG. 8 is the graph of FIG. 7, shown over a number of cycles, over a period of time.

As shown in FIG. 7, beyond the time 70 the gap remains full-open, and liquid pours through the gap, and out of the borehole, at a constant rate until the gap is once more closed. The intent is that the apparatus be used for injecting the liquid in pulses, over a prolonged period of time. FIG. 8 is a graph of flowrate vs time, and shows a typical pulsing configuration, over several pulsing cycles. In this case, it will be noted that the slider closes (almost) as quickly as it opened. The sudden reduction in flowrate, if rapid enough, can also cause a seismic wave to propagate out into the formation.

Figure 9:
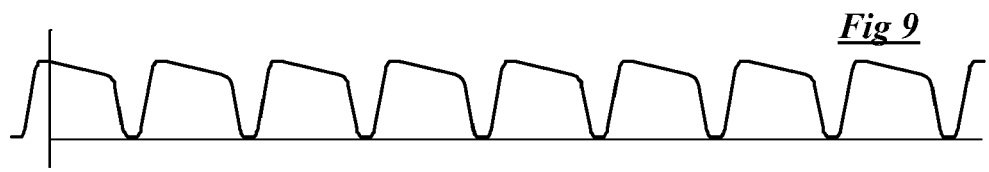
FIGS. 9-11 show graphs corresponding to FIG. 8, but under different conditions.

As shown in FIGS. 7,8 the flowrate remains at a maximum so long as the gap remains full-open. Of course, flowrate is proportional, not just to the size of the gap, but also to the pressure differential across the gap. In many cases, this pressure differential would not be maintained constant throughout the cycle, but would start to decrease as liquid is injected, leading to a corresponding reduction in flow rate. This condition is shown in FIG. 9. (Note that in FIG. 9, the pressure differential not being constant, the graph of flowrate vs time now no longer corresponds to a graph of gap-size vs time.)

Figure 10:
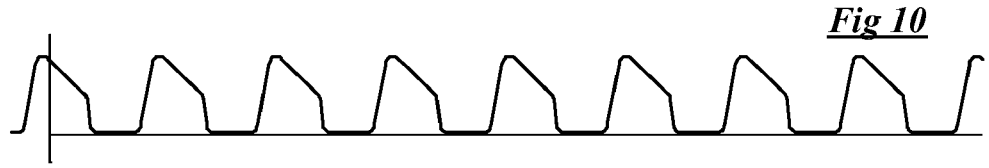

Depending upon how the pressure is generated, it might be the case that the pressure differential, and hence the flowrate, drops off rapidly as liquid is injected. It might even be the case that the flowrate drops to zero, i.e no more liquid is injected, per cycle—for the reason that no more pressurised liquid is available rather than because the slider has been closed. FIG. 10 shows the approach of this condition. Once the slider has been closed, and the gap is once more zero, now the pressure in the liquid upstream of the (now closed) gap can once more be pressurised. It might take some time to re-pressurise the upstream liquid to the magnitude required for an energetic seismic wave. Thus, the closed portion, between cycles, might not be very small, as in FIGS. 8,9, but might need to be a longer proportion of the whole cycle, as in FIG. 10.

It is important to have enough pressurised liquid stored upstream of the closed gap. The reservoir in which the pressurised liquid is stored should be, not only of high volume, but also should be connected to the gap by a conduit of large cross-sectional area—there would be no point in providing a large gap if the conduit leading to the gap were restricted. The conduit in this case includes the annular passageway 72 leading from the reservoir. In the apparatus as illustrated in FIG. 1, the gap 25 is forty cm in circumference, and the gap, when fully open, is 7.62 mm axially. Thus, when the gap is full-open, the area available for conveying flow is around thirty sq.om. The conduits leading to the gap should have a greater flow-conveying area than that, preferably by a large margin.

Figure 11:
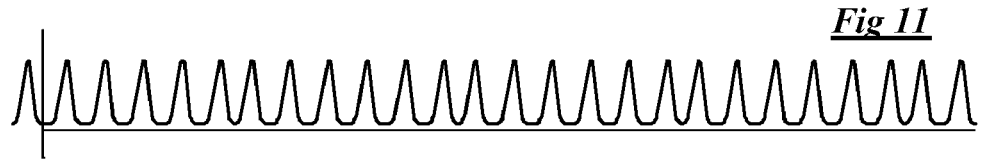

In FIG. 11, now the pulses are carried out at a greater frequency, such that the gap starts to close even before it has fully opened. Still, the slope of the ramp portion determines the seismic component. The higher cycling frequency usually is done when the ground is reaching its limits of saturation, i.e when not much more volume of liquid can be forced into the formation, per cycle—which is likely to be when the high-energy seismic component can be most advantageous, i.e when the ensuing porosity wave suffers the least attenuation, and hence propagates a further distance.

It will be noted that, in all the FIGS. 7-11, the slope of the ramp 64 is the same. In all the illustrated variations, it is the steepness of the slope of the ramp portion 64 that determines the energy of the seismic wave. Thus, all the variations can be expected to create seismic waves of about the some energy. The variations may be regarded as resulting from the situational and mechanical compromises in an apparatus that has been designed to maximise the steepness of that slope.

It is not essential that the flow rate be completely cut off, down to zero, between cycles. The energy of the seismic wave depends on the slope of the ramp portion 64, and a small residual leakage would not affect that. On the other hand, at pressure differentials of 1000 psi, even a tiny residual gap can let through a sizeable flowrate, and the leakage should not be so large as to interfere with the ability of the apparatus to create and sustain a high pressure upstream of the slider, just before the slider is opened.

It can be expected that the gap 25 will crack open, first, at one particular point on the circumference of the gap, while other points on the circumference of the gap are still touching. Then, the other points around the circumference of the gap will open progressively, until finally no part of the circumference is touching. With reasonably precise manufacturing accuracy, it can be expected that the progressive or gradual opening is completed well before the G-20% gap (point 65 in FIG. 7) is reached.

As mentioned, the balance-seal 40 diameter should be equal to, or only slightly larger or smaller than, the sealed diameter of the gap-seal 73, i.e the diameter at which the sealing face 34 makes contact with the seat face 35. When the gap-seal diameter is about twelve cm, of course the solenoid 38 cannot be expected to supply enough force to open the gap against the force resulting from that pressure applied to the whole area of the slider. The solenoids can be expected to supply no more than about 1000 N, typically, whereas the force generated by a pressure differential in the region of 5 MPa, acting over a twelve-cm-diameter area is several tonnes. That is why the slider is mounted between diameter-balanced seals. Thus, the seal 40 is a balance-seal, which balances, or almost balances, the gap-seal 73. The space 50 is part of, or communicates with, the chamber 23, whereby the hydraulic pressure differential is the same across the gap-seal 73 as across the balance-seal 40.

If the balance-seal 40 and the gap-seal 73 were of equal diameter, the hydraulic pressure would exert no net biasing force on the slider. If the balance-seal 40 diameter is slightly smaller than the gap-seal 73 diameter, the hydraulic pressure exerts a net force tending to urge the slider towards the open condition; if the balance-seal 40 diameter is made a little larger than the gap-seal 73 diameter, the hydraulic pressure exerts a net force tending to urge the slider towards the closed condition. As mentioned, biassing the slider towards the open condition is preferred.

Even though the force on the slider 24 is small when the balance-seal 40 and the gap seal 73 are (almost) balanced, still the balance-seal exerts a large seal-friction opposing movement of the slider. The magnitude of the seal friction, at the larger pressure differentials, can be expected to be of the order of a few kN (the seal-friction being proportional to the applied pressure). Therefore, the magnitude of the out-of-balance biassing force (attributable to the difference in diameter between the gap-seal 73 and the balance-seal 40) can advantageously be arranged to overcome the seal friction inherent in the balance-seal 40 at high pressure differentials, or to contribute substantially to overcoming the seal-friction, bearing in mind that the springs 39 also contribute towards overcoming the seal-friction. A key function of the apparatus as described herein is to provide that the slider 24 opens very rapidly, and the large friction forces attributable to the balance-seal 40 count against that function.

The designer might prefer to take measures to reduce seal friction. For example, the balance-seal can be made of low-friction material, such as PTFE. It can be difficult to ensure that such materials make an absolutely tight seal at very low pressure differentials, but that is not too important in this case, in that the balance-seal, like the gap-seal, is not required to seal absolutely, when closed.

A seal that is forced to move, under pressure, even through a short distance such as seven or eight mm, every few seconds, might be expected to have a reduced service life. The life of the balance-seal 40, arranged in the manner as shown, however, can be adequate, given that the seal does not heat up, the seal being flushed with incoming (cold) liquid every stroke.

Further measures that reduce seal friction may be considered by the designer. Apart from the use of low friction materials, another measure is that illustrated in FIG. 12. Here, the balance-seal takes the form of a tight clearance between a sleeve 74 of the moveable slider 75, and a corresponding diameter 76 of the fixed component 7B of the apparatus. The tight clearance extends over a long axial distance. Such a seal is not, of course, capable of sealing one hundred percent—but that is not required. The requirement is to enable a pressure differential of e.g 5 MPa to obtain for a period of a second or two—and a long, tight clearance can be expected to accomplish that.

Another difference between the apparatus shown in FIG. 12 and that shown in e.g FIG. 1 is that, in FIG. 12, the solenoid coils 79 move with the slider while the core 80 remains stationary. The portion 82 of the core between the coils is made of magnetic iron, while the portions of the core 80 outside the portion 82 are, like the rest of the metal components of the apparatus, of (non-magnetic) stainless steel.

A disadvantage of having the coils move is that the leads and cables conveying electricity to the solenoids have to cope with the movement. However, the movement is not large. An advantage is that there is no need for the spoked construction, as in FIGS. 1,3, wherein radial spokes are required to form a structural bridge, through the moving slider, between the stationary central core 43 and the annular stationary components 48,50.

In the apparatus shown in FIG. 12, the choke and the check valve as illustrated in FIG. 1 are not present. Thus, the FIG. 12 injector would not be not suitable for use in tandem with other devices in the same borehole, where liquid to be injected is passed through from injector to injector.

In another alternative (not shown), the designer may prefer to arrange the solenoids inside-out, i.e with the coils thereof located inside a tubular magnetic core: in that case, not only are bridging spokes not needed, but also the electrical wires do not need to cope with movement.

Figure 15:
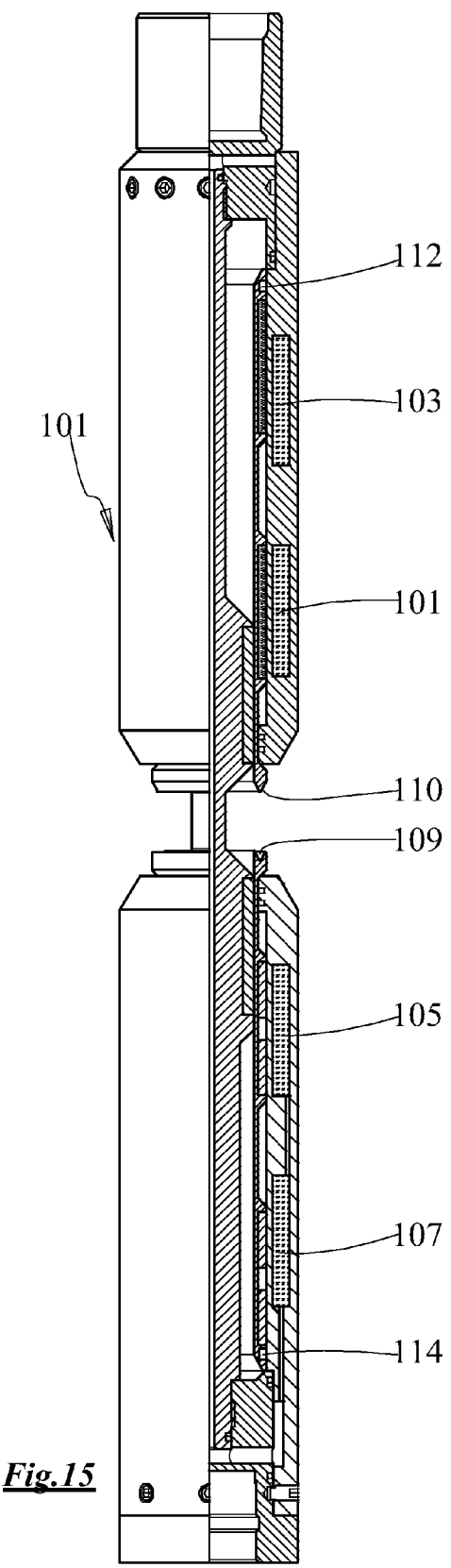
FIG. 15 is a cross-section of a double-acting downhole injector apparatus.

In a further alternative apparatus, it is arranged that both the seal-face and the seat are on components that both move axially, relative to the non-moving housing of the apparatus. Thus, upon the valve being triggered to open, the seal-face is driven downwards, while the seat is driven upwards (or vice versa). It may be arranged that one component is attached to and moves with the solenoid core, and the other component is attached to and moves with the solenoid col. Alternatively, and as shown in the apparatus 100 depicted in FIG. 15, four solenoids are used: upper opening solenoid 101, upper closing solenoid 103, lower opening solenoid 105; and lower closing solenoid 107. The intent in this case is that the total movement between closed and full-open is shared between two moving components, whereby the overall time needed to go from the closed condition to the full-open condition might, at least theoretically, be halved. However, the structure of the apparatus in this case is somewhat more complex and more vulnerable to being damaged. It may be noted that, in FIG. 15, no springs are provided, i.e the movements of the valve-seat 109 and the valve-face 110 are controlled solely by the solenoids. Both the upper and lower movable components 109, 110 are furnished with balance-seals 112,114. Electrical leads for the two bottom solenoids 105,107 pass through a central bore 116 (as must other service connectors, if required). (FIG. 15 is not to scale diametrally.)

Another measure that is aimed at enabling the slider to move from closed to open conditions very rapidly will now be described. This measure involves a lost-motion connection between the component that responds directly to the magnetic forces created by the solenoids and the slider itself. In FIG. 13, the moveable core 83 is not fixedly attached to the slider 84; rather, a boss 89 of the slider 84 can move between upper and lower abutment faces 85,86 on the core. FIG. 13 shows the position when the upper closing solenoid is energised and is holding the slider in the closed condition, the gap-seal 87 being closed.

Now, when the solenoids are switched over to DOWN, at first it is only the core 83 that moves downwards—the movement of the core being driven by both by the open-solenoid, and by the biassing springs. At this time, the movement of the core 83 is not impeded by seal-friction on the balance-seal 40, so the core 83 can accelerate downwards very rapidly. However, at first, the seal-friction is enough to keep the slider 84 from moving downwards; the only force driving the slider downwards at this time is the out-of-balance force attributable to the difference between the diameter of the balance-seal 40 and the diameter of the gap-seal 87, and the designer can easily see to it that this force is smaller than the seal-friction.

Thus, because of the lost-motion connection, the slider 84 does not start moving downwards until the abutment face 85 strikes the boss 89 of the slider 84. At this point, now the core is already up to full speed, and therefore adds its momentum to the force available from the lower opening solenoid 88, and from the springs, to drive the slider. The result is that the slider now accelerates very smartly indeed from the closed to the open position. One benefit of the FIG. 13 arrangement is that the heavy components have started to move, and are already travelling very fast, by the time they strike the slider, and jerk the balance-seal free. That is to say, such acceleration-inhibiting factors as inductive-hysteresis of the coils, slack take-up, inertia of heavy parts, low-rate elasticities, and the like, are all overcome already, before the seal itself starts to open.

As shown in FIG. 1, when the slider 24 is moved upwards to the closed condition, the slider contacts the gap-seat 35 on a metal-to-metal basis. This contact is likely to be quite forceful, and, since the hammering contact is repeated, typically, every few seconds (and will likely include bouncing/rebounding), it might happen that the contacting faces become worn, over a long period of service. FIGS. 14*a,b* show the use of an elastomeric seal-block 90. When the slider closes against the seat face 35, much of the hammer impact is absorbed, given the elastomeric nature of the material.

It will be noted in FIGS. 14*a,b* that, again, there is a lost motion connection between the solenoid core 92 and the seal-block 90, although now the slider 93 remains fixed to the core 92 (by means of the roll-pin 94), and only the seal-block 90 itself slides relative to the core 92. Thus, the main mass of the core 92 and slider 93 is already in motion and up to speed before the slider 93 slams into, and picks up, the seal-block 90. Again, given that there is a lost-motion connection, in which the seal itself remains closed for a moment after the core has started to move, the diameter of the balance-seal 40 should now be slightly larger than the diameter of the gap-seal, to ensure that the gap-seal remains closed until the seal-block 90 is picked up and slammed downwards by the slider 93.

As mentioned, it is a major function of the apparatuses as disclosed herein to provide a very rapid increase in flowrate of the injected liquid. The steeper the slope of the graph of FIG. 7, the more energy there is in the seismic wave that is projected out of the borehole and into the surrounding formation, and it has been described how the various factors can enhance this steepness. In order to make high speed opening, not just possible, but reliably repeatable every few seconds over a prolonged cycling period, it is recognised that the valve gap preferably should be as large diametrally as possible, in order to maximise the flow-conveying area for a given axial travel.

For this reason, preferably, there should be no functional components of the injector apparatus that lie or extend radially outside the diameter of the gap. This preference may be qualified and explained as follows. In the illustrated apparatuses, the outside diameter of the slider 24 is only slightly less than the overall diameter of the outer body 36—being slightly less in order that the (movable) slider 24 may be protected from striking against the casing 27 walls as it goes down the borehole. But apart-from that, the slider 24 and the gap 25 are as diametrally large as possible. Thus, where the injector apparatus has an overall diameter e.g of thirteen centimeters, the gap seal/seat engagement diameter should preferably be not less than about twelve cm. Of course, there must be metal diametrally outside the seal diameter, to provide structure for the seal surfaces, but the preference is that the designer should see to it that there is nothing else outside the seals, end in particular that no relative-moving functions performed by components, or portions of components, that lie diametrally outside the seals.

Thus, the gap 25 preferably should be as large, diametrally, as possible, given the mechanical constraints of the structure. If the designer is aiming to make the seals as large as possible within the apparatus, and within the limits imposed by unavoidable structural requirements, it is simple enough to provide that the seal diameters would be less than ten millimeters inside the overall diameter of the downhole apparatus. (Usually, the seal diameter can be within five millimeters of the overall diameter.) Thus, where the overall diameter is thirteen cm, the seal diameters can be twelve or 12½ cm. At such diameters, an adequate axial opening of the gap can be achieved if the slider moves axially about seven or eight millimeters.

As mentioned, either of the two seal diameters (i.e the valve-gap-seal and the balance-seal) may be the larger, depending on whether the designer wishes to bias the slider open or closed. Preferably, in the structure of the injector apparatus, there should be nothing outside the diameter of the larger seal other than the minimum physical structure needed to support the seal itself. Thus, where the balance-seal is the larger, and the balance-seal is such as to require a seal-groove to house the seal itself, the seal-groove should be cut in the male component, not in the female component. If the seal-groove were cut in the female component, the female component, which lies outside the seal diameter, would have to be radially thicker, which would limit the seal diameter of the balance-seal.

As a generality, the difference between the diameter of the valve-gap-seal and the diameter of the balance-seal will be less than one millimetre. Even that difference might be too large, in that, at twelve cm diameter, and over an annular width of one millimetre, a pressure differential of five MPa represents a force of 1885 N—which might be greater than the force that can conveniently be brought to bear by the opening-solenoid—whereby, at least at the higher pressure differentials, preferably, the difference in effective-seal-diameter between the gap-seal and the balance-seal should rather be not more than about ½ mm. The designer must, of course, provide an opening solenoid of enough force capacity as to open the valve under the conditions likely to be encountered during use; either that, or the designer should taylor the conditions of use to the force available from the solenoid.

Figure 16B:
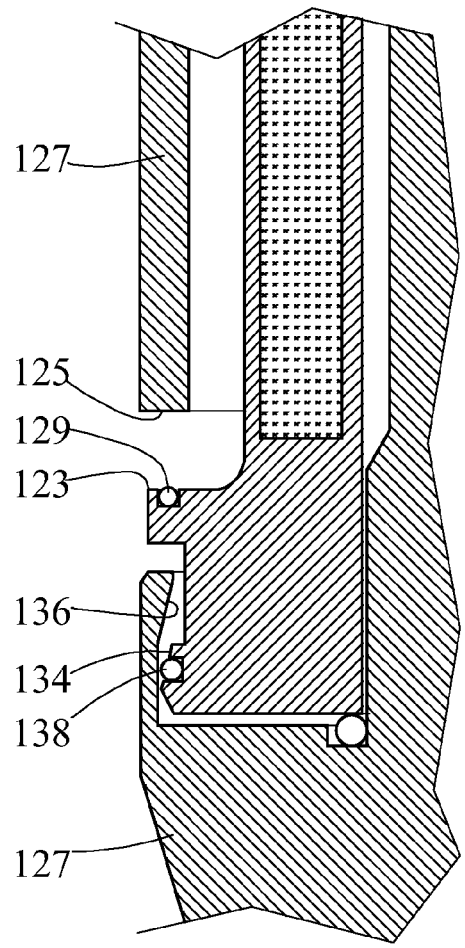
FIG. 16b is a close up of a portion of the view of FIG. 16a, shown in an open condition.
Figure 16A:
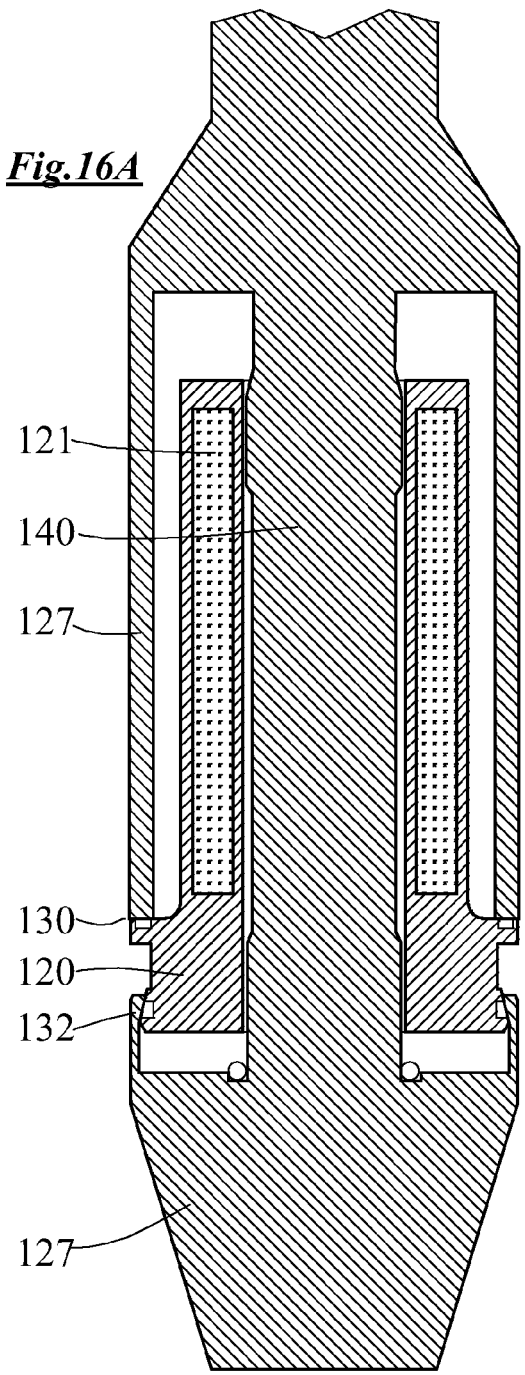
FIG. 16a is a diagrammatic cross-section of yet another downhole injector apparatus, shown in a closed or sealed condition.

FIGS. 16a,16b show another variant. In the apparatus depicted in these drawings, the slider 120 is driven to move by the solenoid motor 121. In the closed condition illustrated in FIG. 16a, the solenoid 121 holds the slider 120 in its UP position. Now, the valve-face 123 on the slider 120 is in sealing engagement with the valve-seat 125 on the housing 127. An O-ring 129 is provided to make sure of the efficacy of the whole valve-seal 130.

The slider 120 also includes a balance-seal 132, comprising a balance-face 134 on the slider 120 and a balance-seat 136 on the housing 127. Again, an O-ring 138 is provided to make sure of the efficacy of the balance-seal 132.

At the moment the valve-seal 130 opens, the balance-seal 132 also opens, more or less simultaneously. Therefore, the balance O-ring 138 will not be subjected to being dragged over a metal surface. Over a long service period, this reduces abrasive wear and seal friction.

The drawings of FIGS. 16a,16b are diagrammatic, and do not show details of the actual structures. Obviously, the designer must see to it that the structures are manufactured in separate components which can be assembled together. However, it will be understood that the valve-seat 125 and the balance-seat 136, even if it were possible to produce these seats in the same single piece of material as diagrammatically shown (which of course is not physically possible), are likely to run into problems of manufacturing tolerances, and into problems of ensuring the concentricity and squareness of the various faces and seats. It should be noted that these problems will or might arise in some of the other design variants, and equivalent measures can then be taken, as will now be described.

The valve-face 123 and the valve-seat 125 of the valve-seal 130 lie nominally in a plane perpendicular to the axis of the cylindrical housing 127. It is important that the valve-face 123 and the valve-seat 125 touch properly together around the whole circumference. If the face and the seat were to touch at the north side of their circumference, and yet leave a gap at the south side, due e.g to a build-up of small misalignments, the function of the valve-seal 130 will be compromised; perhaps to the extent of making it impossible to build up enough pressure differential across the valve-seal to ensure a strong high-energy seismic wave. To obviate this possibility, in the position shown in FIG. 16a, the slider 120 takes its concentricity from the balance-seal 132; the slider 120 can rock (slightly) angularly within the balance-seal 132, and thus the slider 120 can come to rest, when urged upwards into the closed position, with the valve-face 123 perfectly flat-against-flat onto the valve-seat 125. The slider 120 should be loose enough upon the core 140 of the housing 127 that it can rock sufficiently to accommodate all the mismatches and misalignments likely to be encountered. Given that the metal faces can be truly flat-to-flat, the designer might decide to dispense with the O-ring 129, although it would be prudent to retain it. Equally, the O-ring 138 in the balance-seal 132 might be dispensed with, but it would be prudent to retain it. For the reasons as mentioned above, the balance-seal 132 should have the same, or almost the same, seal-diameter as the valve-seal 130.

A shock-absorber in the form of O-ring 141 is provided, to absorb some of the impact of the slider 120 being hurled against the housing 127. Alternatively, an hydraulic cushion may be provided, e.g of the traditional kind as used in conventional hydraulic or pneumatic rams to absorb the shock of the piston slamming solidly against the end of the cylinder.

In the downhole environment, diametral space is at a premium, but usually the designer is free to take whatever axial space is desired. Thus, if the designer wished to increase the forcefulness of the solenoid, for example, there is a very strict diametral limitation beyond which the solenoid cannot be increased in diameter, but the solenoid can be increased in axial length (or further solenoids can be added, lengthwise) almost at will.

The manner in which the designer can make the best use of the shape of the available space will now be described with reference to FIG. 17. Again, this drawing is a diagrammatic view of an injector, from which much of the practical detail has been omitted.

It is recognised, when seeking to maximise the magnitude of the energy that can be focussed into the seismic waves, that the designer should seek to make the best use of the confines imposed by the geometry of the downhole shape. Radial or diametral space is at a strict premium, and has to accommodate everything, including mechanical structure, pipes, wires, conduits, and all. The shape of the borehole, in which the downhole structure must fit, of course is a long/narrow right-cylinder, perhaps with some distortions.

The designer of an apparatus that is to be lowered down the borehole will generally see to it that the apparatus 145 is right-cylindrical, of a smaller overall diameter OD than that of the borehole casing BCD. Within that confine, the designer will wish to maximise the outer diameter OD of the apparatus. Often, an apparatus will not be quite circular, in that it might have protruding screw-heads or the like. In FIG. 17, the overall diameter OD cm should therefore be regarded as the diameter of the cylinder that circumscribes the apparatus 145. This circumscribing circle has a circumference OC cm, and the area enclosed within the circle has an area of OA sq.cm.

Liquid is fed down from a pressure source or reservoir at the surface (not shown in FIG. 17) to a near-valve reservoir 147. The reservoir is charged with the pressure due to a body of compressed nitrogen in an accumulator 149, which also is supplied and controlled from the surface. The near-valve reservoir has a (comparatively large) cross-sectional area RA sq.cm.

From the near-valve reservoir 147, liquid travels via a conduit 150 to the valve-gap 152. Usually, the conduit 150 will not be of constant uniform cross-sectional area, in that the conduit might include the open-spoked configuration, with windows and passages of various profiles and sizes as described in relation to the other design variants. The conduit cross-sectional area CA sq.cm should be measured as the minimum through-flow-conveying cross-sectional area that is encountered by the liquid as it passes along the length CL of the conduit, between the (larger) reservoir area RA sq.cm and the valve-gap 152. Preferably, the conduit should be short, i.e being less than ten times the overall diameter OD of the downhole-structure.

At the valve-gap 152, the valve-face 154 on the slider 156 and the valve-seat 158 on the housing 160 are complementarily conical. It will be understood that, in the closed condition, the valve-face 154 and the valve-seat 158 make touching, sealing contact over an annular contact-area. The locus of the mid-points of the annular contact-area, at each radius around the annular contact-area, defines a valve-gap-seal-circumference VGSC cm, having a diameter VGSD cm, and an area VGSA sq.cm.

No balance-seal is shown in FIG. 17, but a balance-seal will usually need to be provided, as in the other apparatuses depicted herein. The balance-seal has a seal-diameter and a seal-area BSA, which is computed in a similar way.

In the open condition, as shown in FIG. 17, the slider 156 has moved down an axial valve-gap length of VGL cm. The resulting full-open gap has a valve-gap-throat-opening VGTO cm. The throughflow-conveying area of the valve gap throat VGTA is defined as VGTA VGTO×VGSC sq.cm.

The values of the above parameters, and the relationships between them, when the apparatus has been engineered for adding a high-energy seismic component to a bulk-volumetric pulse, will now be discussed.

The relationship between the valve-gap-seal-circumference VGSC cm and the circumference of the circumscribing circle OC cm is important. The designer should aim to make VGSC as large as possible, given the strictures of the overall cylindrical shape. It is usually easy enough to design the apparatus such that VGSC is more than 90% of OC. If VGSC is less than 85% of OC, that is less preferred. And if the designer has made VGSC less than about 75% of OC, that is an indication that the designer is not seeking to make the best and most efficient use of the available geometry to provide an energetic seismic component. To illustrate these percentages by way of example: in an apparatus having an OD of 127 mm (OC=399 mm), the valve-gap-seal-diameter VGSD should be 75% or more, i.e should be 71 mm (VGSC=223 mm) or more. Preferably, VGSD should be 85% or more of OD, i.e should be 96 mm (VGSC=302 mm) or more. In a particular example, the VGSC was 98 mm.

Another relationship of importance is that between the valve-gap-throat-area VGTA sq.cm and the conduit area CA sq.cm. Given that the liquid has to pass along the conduit 150 on its way to the valve-gap 152, there is no point in designing the valve-gap to have a throat area larger than CA sq.cm. Indeed, if the actual physical valve-gap-throat-area is larger than CA, for the purposes of these relationships the VGTA is deemed to be equal to CA—that is to say, if VGTA exceeds CA, the excess is ignored. (It is noted that the discussion, above, of the G-20% to G-80% time period relates the G-20% and G-80% figures to a valve-gap-throat-area of G-100%. In that computation, the valve gap G-100% equals the actual full-open valve-gap, unless the valve-gap-throat-area at that full-open condition exceeds the conduit-area, in which case the full-open valve-gap G-100% is deemed to be the gap at which the valve-gap-throat-area is equal to CA.)

But rather, given the fact that the conduit length CL is longer than the length of the valve-throat (and given that frictional resistance to liquid flow is proportional to conduit length), the designer preferably should make CA somewhat larger than VGTA, and it is suggested that the valve-gap and the conduit area should be engineered, together, so that CA sq.cm is about 20% larger than VGTA sq.cm. Thus, the designer should seek first to maximise the conduit area CA sq.cm, and then design VGTA to suit. If the conduit has to be long and tortuous, then CA should be closer to 30% larger than VGTA. If the conduit is short and straight and open (as it is shown diagrammatically in FIG. 17), then the designer preferably would make CA about 10% larger than VGTA.

The designer should not make the valve-gap-throat-area too small, of course, as then full advantage could not be taken of the hard-won ability of a large conduit to convey large flowrates of liquid. Thus, VGTA should not be less than 40% CA as a lower limit, and preferably VGTA should not be less than 50% of CA sq.cm.

Another relationship of importance is that between the valve-gap-throat-area VGTA sq.cm and the overall area OA sq.cm inside the circumscribing circle. A designer who is seeking to maximise the energy of the seismic components of the pulse cycles should be able to make VGTA larger than about 20% of OA. If VGTA is below that, that is an indication that the apparatus has not been designed to make the best use of the cylindrical shape of the downhole environment to produce high-energy seismic waves.

It will be understood that, if VGTA is more than 20% of OA, then the conduit should also be designed to be of a correspondingly high area CA sq.cm—as mentioned, there is no point in VGTA being greater than CA (and again, for the purpose of calculating the flow-conveying cross-sectional area relationships, if the actual full-open valve-gap is larger than CA, the VGTA in the calculation is deemed to be equal to CA sq.cm).

This leads to consideration of another relationship of importance, namely that between the conduit area CA sq.cm and the overall area OA sq.cm inside the circumscribing circle. With all the design constraints as to what has to be accommodated within the overall area of the apparatus, it is sometimes not possible for the designer to provide a conduit area CA sq.cm that is more than about 50% of OA sq.cm. While taking into account the need to meet all the other mechanical requirements of the apparatus, however, the designer should aim for a conduit area CA of more than about 30% of OA sq.cm. If the designer provides a conduit of area CA less than about 20% of OA, that would be an indication, again, that the designer was not seeking to make the best use of the geometry of the available space envelope for the purpose of maximising the seismic energy.

To illustrate these percentages by way of example: in an apparatus with an OD of 127 mm, OA is 127 sq.cm. A conduit area CA of 25% of OA is 31.7 sq.cm, and a CA of 35% of OA is 44.3 sq.cm. In a 95 mm OD apparatus, OA is 71 sq.cm. A CA that is 25% of OA is 17.7 sq.cm, and a CA that is 35% of OA is 24.8 sq.cm.

Again, the designer should stay within the above relationships in order to achieve an energetic seismic component. It is of little use to provide a valve that opens very rapidly if, due to other compromises, that rapidity of opening turns out not to be the critical factor in determining the flowrate at which the liquid can be injected out. Thus, the conduit 150 should be engineered to ensure that the liquid can flow out of the valve-gap 152 at the highest possible speed.

Also, the near-valve reservoir 147 should be large enough, and the accumulator 149 should be resilient enough, to maintain adequate pressure differentials throughout the whole period while liquid is being discharged. In other words, the rapid-opening valve-gap is not functional in itself—it has to be backed up by an apparatus that has ability to convey large volumes through the open valve-gap at large flow rates. It is suggested that the near-valve-reservoir should have a capacity of at least half a liter (for use in boreholes in the 90 mm to 130 mm diameter range), as will now be discussed.

An apparatus that is capable of doing surge-pulsing will typically be able to inject several liters of liquid, per pulse (i.e per cycle). Typically, that charge-volume of liquid is fed down from a pressure source or reservoir at the surface (i.e a reservoir other than the near-valve reservoir 147). But the conduits that lead down from the surface typically are too narrow and too long to permit a large enough throughflow velocity to create much of a seismic pulse—which is why the near-valve reservoir is provided. (Of course, if the conduit from the surface reservoir is in fact wide enough, the near-valve reservoir may be dispensed with.) In most instances, the liquid that is to be injected very rapidly, for creating the seismic component, at the start of the outflow portion of the surge-pulsing cycle, will need to be stored close to the valve, and will need to be connected to the valve by a wide conduit. Thus, in a case where there is a near-valve conduit, the computations mentioned above that refer to the various dimensions of the conduit apply to the short conduit that connects the near-valve reservoir to the valve-gap.

As mentioned, the volume of liquid that is to be stored in the near-valve reservoir need not be the whole several liters of the whole per-cycle charge-volume. The volume stored near the valve need only be enough to power the seismic wave. The rest of the liters required for the charge-volume can be fed down, relatively slowly, from the surface, in the usual way. Thus, the near-valve reservoir preferably should have a capacity of at least half a liter.

The purpose of the gas-charged accumulator 149 is to maintain the high pressure of the near-valve reservoir 147 during the rapid injection. If desired, once the near-valve reservoir has received a full volume of liquid, the nitrogen can be given a boost of still-higher pressure, from the surface, just prior to opening the valve. Then, after the wave has been created, the nitrogen pressure can be released, e.g during the backflow portion of the cycle, to allow the near-valve reservoir once more to be recharged. For a good high-energy seismic wave, the pressure in the near-valve reservoir should be at least one (preferably two) MPa above the in-ground pressure. The reservoir/accumulator can be charged up during the backflow portion of cycle, so the stored liquid at high pressure is once more ready to create a new seismic wave at the commencement of the next outflow portion of the cycle.

In the drawings, solenoids are shown as drive-motors for driving the valve-member or slider, but other types of forceful drive-motors can be used instead. In general, also, the featured details of the various designs illustrated herein may be advantageously interchanged in the other illustrated designs; that is to say, designers should regard the different features as being interchangeable between the various designs, unless otherwise indicated.

The apparatuses as described herein are designed for use (when suitably scaled) in boreholes in the range in the range 30 cm down to 3 cm. The on-site engineers must of course be aware of the depth at which the borehole perforations are located, and must see to it that the valve-gap is located very close to that depth when it opens. If the valve is too far from the perforations, the seismic waves might be attenuated too much to be useful. It is important, too, that the volume of water inside the borehole, but outside the down-hole-structure, be kept small. If that volume is large, too much of the energy of the pulse might be dissipated inside the borehole, without passing through the perforations and out into the formation around the borehole. Thus, the size of the downhole structure should be chosen to almost fill the borehole, and the packers should be located just above the downhole-structure (and just below the downhole-structure if that, too, needs to be closed off).

The expressions seismic waves, and seismic components of waves and pulses, and similar, have been used herein. In this specification, it is intended that these expressions be understood to refer to the type of wave, or rather to the type of wave profiles, that are induced in the ground around a borehole when a stored volume of high pressure liquid is released into the ground very rapidly.

In order for these waves to be effective to improve the conductivity of the ground, and to allow more liquid to be injected into the ground, it is recognised that the waves should have a large enough energy content to be detectable or measurable a distance of at least five meters radially away from the borehole. It is expected that the waves will be detectable much further away than that in many cases: but if the waves cannot be detected at the stated minimum of five meters, it is considered that the wave is too weak to provide any worthwhile contribution to improving the conductivity and liquid-injectability of the ground. For example, if the ground is not fully saturated with liquid, or if the liquid is not coherent over a large volume around the borehole, the induced waves might not propagate in a worthwhile and effective manner. Similarly, if the speed of opening the valve-gap is too slow, or the induced pressure differential that is responsible for forcing liquid out of the borehole is too small, again the induced seismic wave might not propagate in a worthwhile and effective manner.

The invention claimed is:

1. Apparatus for superimposing a seismic wave onto a flow of liquid being injected into the ground around a borehole, characterised by the following combination of features:
   the apparatus includes a reservoir for storing, under pressure, the liquid to be injected into the ground;
   the apparatus includes a downhole-structure, which is suitable for lowering down into the borehole;
   the downhole-structure has an overall-circumference, being the circumference that circumscribes all portions of the down-hole structure,
   the overall-circumference measures OC cm in length, measured in a plane at right angles to the axis of the borehole;
   the downhole-structure includes a valve, comprising a valve-face on a valve-member, and a valve-seat which is movable relative to the valve-member;
   the valve is operable between a closed condition and a full-open condition;
   in the full-open condition, the valve-face lies separated from the valve-seat and lies spaced therefrom by a valve-gap;
   in the closed condition, the valve-face and the valve-seat make sealing contact over an annular contact-area;
   a valve-gap-seal-contact-line is defined as the locus of the mid-point of the said annular contact-area at each radius around the valve-gap-seal-contact-line;
   the valve-gap-seal-contact-line has a valve-gap-seal-circumference that measures VGSC cm; and
   VGSC is larger than seventy-five percent of OC.

2. Apparatus as in claim 1, further characterised in that:
   the downhole-structure is structurally capable of being lowered down into a borehole in that the down-hole structure has a cross-sectional profile, taken at right-angles to the axis of the borehole, that fits within a circumscribing right-cylinder of smaller diameter than the borehole; and
   the overall-circumference OC cm is the circumference of that right-cylinder, which has a diameter that measures OD cm, and an enclosed area that measures OA sq.cm.

3. Apparatus as in claim 2, further characterised in that:
   the apparatus includes a conduit for conveying liquid from the reservoir to the valve;
   the conduit has a cross-sectional conduit-area that measures CA sq.cm;
   the conduit-area CA sq.cm is defined as the smallest cross-sectional area available for conveying liquid, as measured along the whole length of the conduit from the reservoir to the valve-gap; and
   CA sq.cm is larger than twenty-five percent of OA sq.cm.

4. Apparatus as in claim 3, further characterised in that:
   the valve-gap has a valve-gap-throat-area VGTA sq.cm, being the minimum cross-sectional area of the valve-gap through which liquid flows when passing from the conduit, from inside the valve-gap, to outside the valve-gap; and
   the smaller of CA sq.cm and VGTA sq.cm is larger than twenty percent of OA sq.cm.

5. Apparatus as in claim 3, further characterised in that CA sq.cm, being the smallest conduit cross-sectional area at any point along the length of the conduit from the reservoir to the valve, is larger than VGTA sq.cm.

6. Apparatus as in claim 3, further characterised in that:
   in the closed condition of the valve, the axial length VGL of the valve-gap is zero, or G-0% cm;
   G-100% is the smaller of: either (a) the axial length of the valve-gap when the valve is in its full-open condition; or (b) the axial length of the valve-gap in a partially-open condition at which the valve-gap-throat-area is equal to the conduit-area CA sq.cm;
   at intermediate openings of the valve-gap, the valve-gap has an axial length of G-X%, where X is a percentage of the opening between G-0% and G-100%;
   the downhole-structure includes a fixed housing, and the valve-member comprises a slider that can slide axially within the housing, between the open and closed conditions, and the apparatus includes an operable valve-activation motor which is effective, when operated, to so move the slider;
   the valve-activation motor is operable to drive the slider with such rapidity that the valve-gap changes from a G-20% valve-gap to a G-80% valve-gap in a time period T-20-80 that measures less than fifty milliseconds.

7. Apparatus as in claim 3, further characterised in that:
   the downhole-structure includes a fixed housing, and the valve-member comprises a slider that can slide axially within the housing, between the open and closed conditions;
   the conduit is formed inside the fixed housing of the downhole-structure;
   the slider includes an outer portion that lies radially outside the conduit and an inner portion that lies radially inside the conduit;
   the inner and outer portions of the slider are joined by spokes; and
   the spokes lie in respective openings in the fixed housing, through which liquid in the conduit can pass freely between the inner and outer portions of the slider.

8. Apparatus as in claim 2, further characterised in that:
   the apparatus includes a conduit for conveying liquid from the reservoir to the valve;
   the conduit has a conduit-length that measures CL cm;
   CL cm is shorter than ten times OD cm.

9. Apparatus as in claim 1, further characterised in that the downhole-structure includes a fixed housing, and the valve-member comprises a slider that can slide axially within the housing, between the open and closed conditions, and the apparatus includes an operable valve-activation motor which is effective, when operated, to so move the slider.

10. Apparatus as in claim 9, further characterised in that the valve-activation-motor includes an opener-solenoid, of such structure that, when energised, the opener-solenoid urges the valve-member from the closed to the open condition.

11. Apparatus as in claim 10, further characterised in that: the solenoid is fixed inside the fixed housing;
the valve-activation-motor includes a core, located radially inside the solenoid, and the core is movable axially relative to the fixed housing.

12. Apparatus as in claim 9, further characterised in that the valve-actuation-motor includes a closer-solenoid, of such structure that, when energised, the closer-solenoid urges the valve-member from the open to the closed condition.

13. Apparatus as in claim 1, further characterised in that:
the downhole-structure includes a fixed housing;
the valve-gap-seal-circumference VGSC encloses an area that measures VA sq.cm;
the downhole-structure includes a balance-seal, comprising a balance-face and a balance-seat, one of which is included in the housing, and the other of which is included in the valve-member;
in the closed condition of the valve, the balance-face touches the balance-seat over an annular balance-seal-contact-area;
a balance-seal-contact-line is defined as the locus of mid-points of the annular balance-seal-contact-area at each radius around the balance-seal-contact-area;
the balance-seal-contact-line has a circumference, and the area enclosed within that circumference and exposed to liquid pressure from the reservoir measures BA sq.cm;
in the closed condition of the valve, the balance-seal-contact-line is exposed to, and supports, the same pressure differential as the valve-seal-contact-line; and
the area BA is within five percent of the area VA; whereby
the valve-member, in the closed condition of the valve, is subjected to a net force arising from the difference in area between BA and VA in the direction of movement of the valve between the closed and the full-open conditions, of no more than five percent of the force of the said pressure differential acting on the area VA.

14. Apparatus as in claim 13, further characterised in that the said net force acts in the direction to urge the valve to its closed position.

15. Apparatus as in claim 13, further characterised in that the said net force acts in the direction to urge the valve to its open position.

16. Apparatus as in claim 13, further characterised in that the apparatus is so structured that, when the valve condition changes from closed to full-open, the balance-face remains in contact with the balance-seat.

17. Apparatus as in claim 13, further characterised in that the apparatus is so structured that, when the valve condition changes from closed to full-open, the balance-face breaks contact with the balance-seat, substantially simultaneously as the valve-face breaks contact with the valve-seat.

18. Apparatus as in claim 1, further characterised in that the downhole-portion of the apparatus is of such structure that the apparatus is substantially free and clear, around and outside the valve-gap, of any obstruction that would, if present, obstruct passage of liquid from the valve-gap out into the borehole.

* * * * *